Jan. 29, 1929.  F. W. HARRIS  1,700,358
DISK HARROW

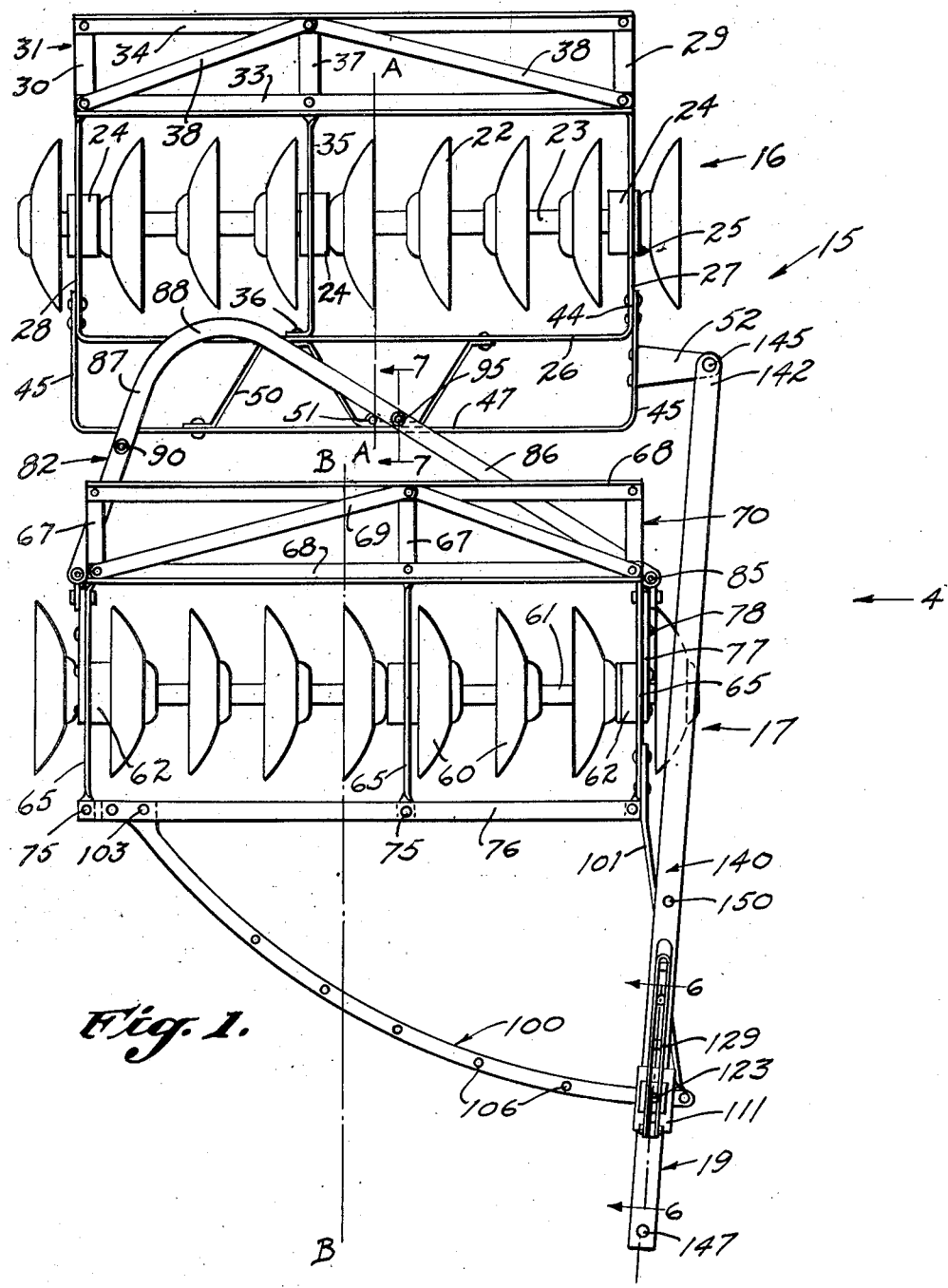

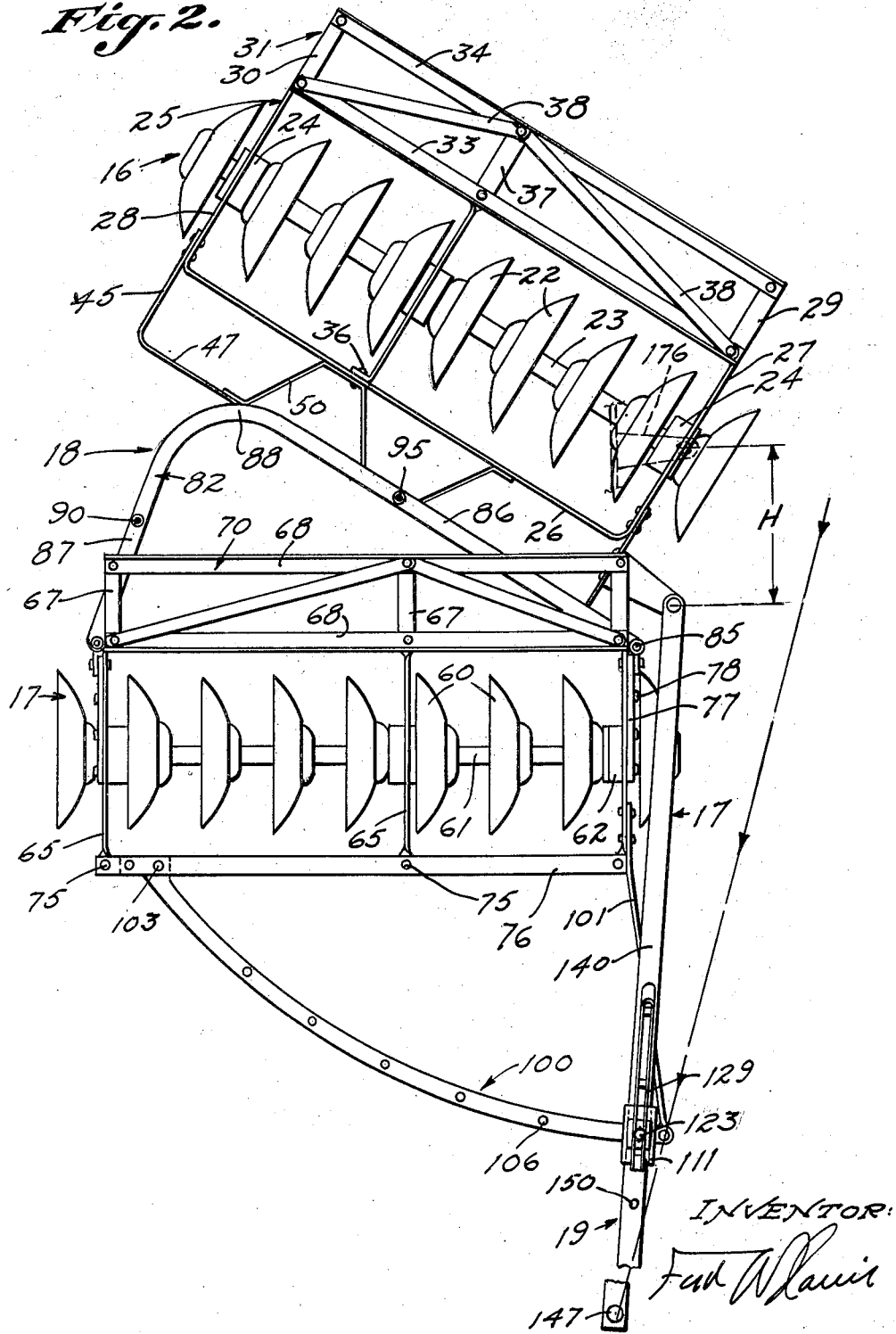

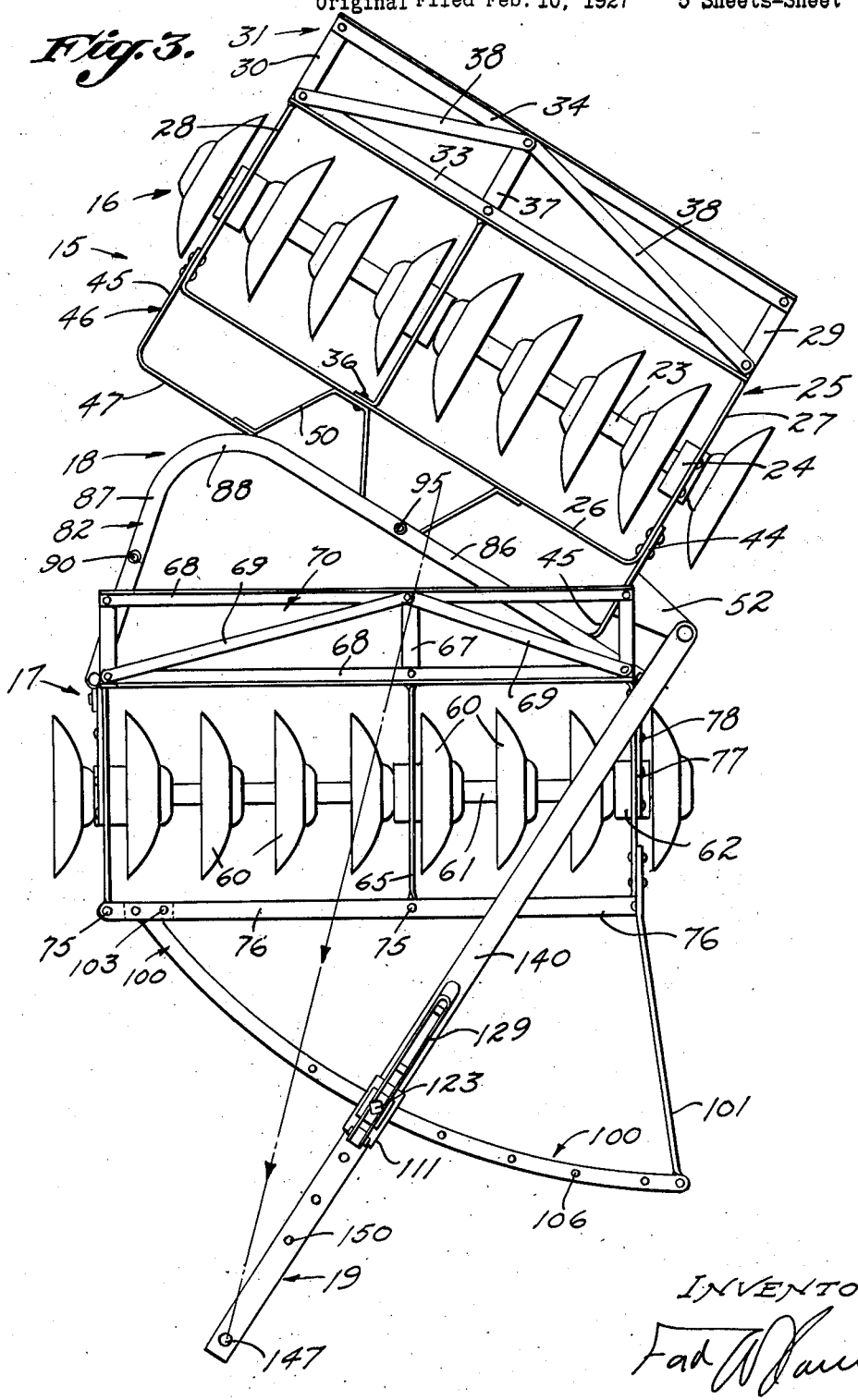

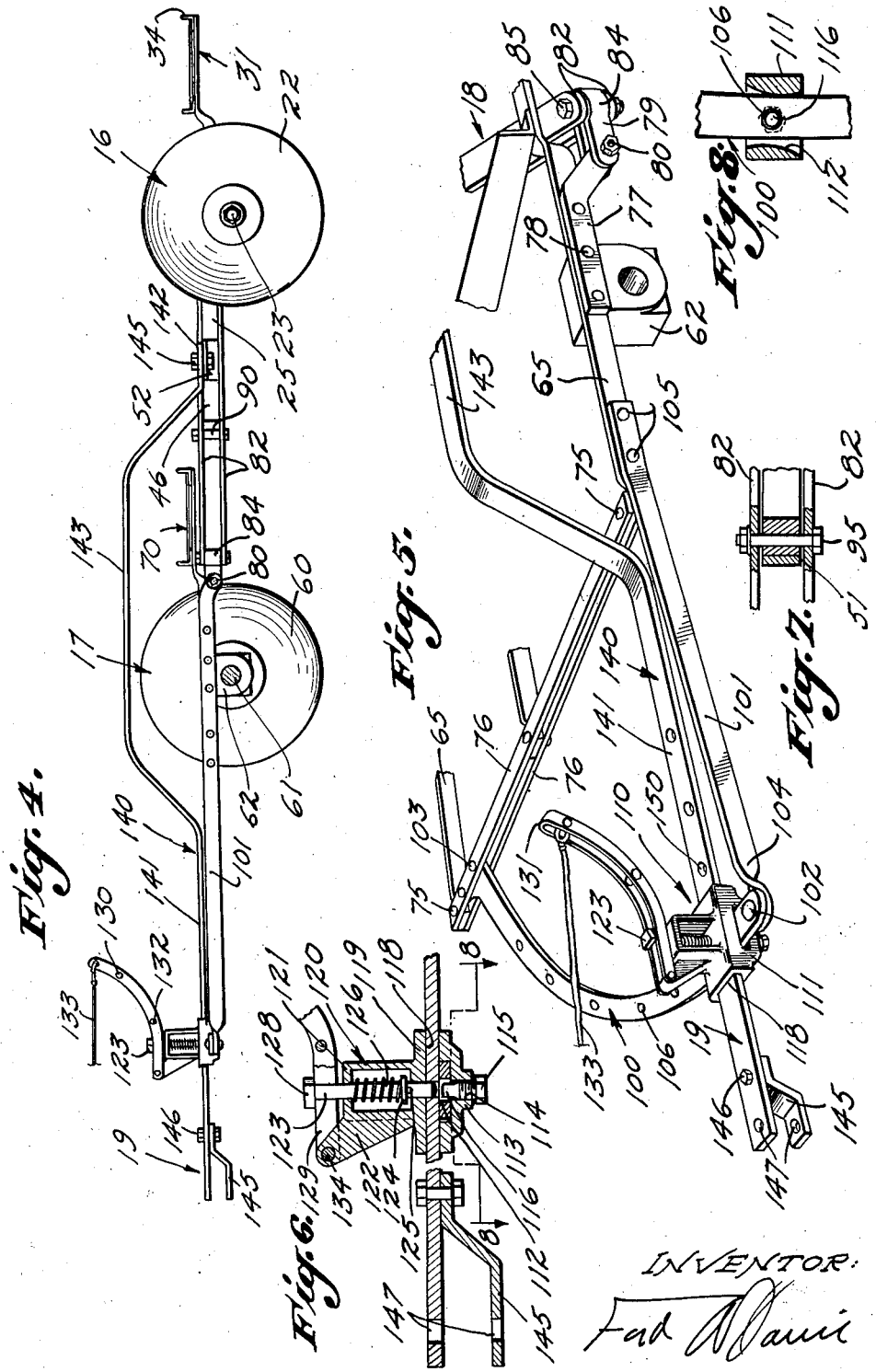

Original Filed Feb. 10, 1927     5 Sheets-Sheet 5

INVENTOR:
Fred W. Harris

Patented Jan. 29, 1929.

1,700,358

UNITED STATES PATENT OFFICE.

FORD W. HARRIS, OF LOS ANGELES, CALIFORNIA, ASSIGNOR TO BRENNEIS MANUFACTURING COMPANY, OF OXNARD, CALIFORNIA, A CORPORATION OF CALIFORNIA.

DISK HARROW.

Application filed February 10, 1927, Serial No. 167,082. Renewed October 17, 1928.

My invention relates to disk harrows and more particularly to a novel harrow of the two-gang type.

In the cultivating of orchards with disk harrows it has been found difficult to cultivate underneath trees having foliage which extends close to the ground because the harrows in use at present follow directly after the tractor by which they are drawn. It thus becomes necessary for the tractor to pass close to the trunk of the tree under which it is desired to work the ground, and the tractor is of such height that the foliage of the tree is frequently damaged.

It is one of the principal objects of my invention to provide a harrow which is of relatively low height and which is adapted to work ground in a path which extends to one side of the path of the tractor which draws the harrow. With a harrow of this type the ground may be worked beneath low hanging foliage without the necessity of thrusting the foliage aside by the passage of the tractor therebeneath, and consequently the danger of damaging the foliage is practically eliminated.

In most of the disk harrows as previously made, a front gang element and a rear gang element are connected together and drawn by a tractor in such a manner that a relative movement between the tractor, and a portion of one of the front or rear gang elements will cause the shifting of these elements relative to each other so that they will be moved between working and non-working positions. In effecting this shifting of the gang elements it has previously been necessary for the tractor to push portions of the harrow a considerable distance which makes the handling of such a harrow in a small space a very awkward matter.

It is a further object of my invention to provide a two-gang harrow in which the gangs may be shifted relative to each other between working and non-working positions by a comparatively short movement of the tractor.

It is a still further object of my invention to provide a two-gang harrow which may be easily controlled so that it will either trail behind the tractor or be extended laterally to a working position to one side of the path of the tractor.

It is a tendency of the following gang of a two-gang disk harrow when in working position to dig in deeper at one end than at the other. It is another object of my invention therefore to provide a means for causing the rear gang to engage the earth equally throughout its length when the harrow is in working position.

Another feature of harrows as made at present which prevents their being used for cultivating beneath low hanging foliage in an orchard is the presence upon the harrow of levers or other parts which extend upward from the harrow on portions of the harrow which might otherwise pass easily beneath said foliage. It is therefore an object of my invention to provide a disk harrow which is adapted for cultivating beneath low hanging foliage in an orchard and which is free from members extending above the disks of the harrow excepting at the side of the harrow which is disposed away from the trees under which the harrow is adapted to cultivate.

A still further object of my invention is to provide a two-gang disk harrow having a novel extensible draft mechanism.

Further objects and advantages will be made manifest in the following description and in the accompanying drawings in which, Fig. 1 is a plan view of a preferred embodiment of the harrow of my invention in a non-working position.

Fig. 2 is a view similar to Fig. 1 and shows the harrow in a working position.

Fig. 3 is a view similar to Figs. 1 and 2 and shows the harrow in a different working position from that in which it is shown in Fig. 2.

Fig. 4 is a side elevational view of the harrow and is taken in the direction of the arrow 4 of Fig. 1.

Fig. 5 is a fragmentary perspective view of portions of the frame work of the harrow.

Fig. 6 is a vertical sectional view taken on the line 6—6 of Fig. 1.

Fig. 7 is a vertical sectional view taken on the line 7—7 of Fig. 1.

Fig. 8 is a horizontal sectional view taken on the line 8—8 of Fig. 6.

Figure 9:
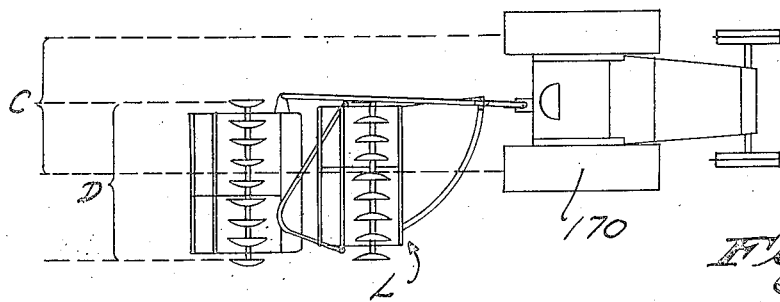

Figs. 9 to 12 inclusive are diagrammatic plan views illustrating the various positions in which the harrow of my invention may be drawn by a tractor.

Referring to the drawings in detail, a harrow 15, as shown in Fig. 1, includes a rear gang 16, a front gang 17, an inter-gang yoke 18, and a draft yoke 19.

The rear gang 16 includes a series of disks 22 which is mounted upon a suitable axle 23 which is provided with journal blocks 24 in a manner and for a purpose well known in the art. A main frame bar 25 is bent so as to form a transverse bar 26 and side bars 27 and 28. The rearmost portions 29 and 30 of the side bars 27 and 28 are twisted into horizontal position and provide ends for a rectangular box-like frame 31 which includes transverse angle irons 33 and 34 which connect the side bar portions 29 and 30. An intermediate bar 35 is connected, as by spot welding, to the central journal block 24 and, at its forward end, at 36, to the forward frame bar 26. The intermediate bar 35 is twisted at its rear end to form a horizontal portion 37 which is attached as shown to the medial portion of the lateral angle irons 33 and 34. The frame 31 may be braced in any suitable manner as by the diagonals 38.

Secured by rivets 44 to the forward portions of the side bars 27 and 28 are the side bars 45 of a rear gang control frame 46. The side bars 45 are formed by bending from a forward lateral bar 47 which extends across the front of the frame 46. The frame 46 is braced by an S bar 50 which is adapted to contact at its nodes with the bars 26 and 47 and be welded or otherwise suitably secured thereto. The S bar 50 is provided with eyes 51 for a purpose which will be described later. These eyes as will be noted are disposed near to the fore and aft central axis A—A of the rear gang 16. An arm 52 is riveted to one of the side bars 45 and extend outward beyond the outermost of the disks 22 of the rear gang 16. The arm 52 is provided with a suitable vertical aperture in its end.

The front gang 17 has disks 60 mounted upon an axle 61 which is provided with journal blocks 62, these elements being identical to similar elements in the rear gang 16. Fore and aft bars 65 are disposed in a vertical plane and are secured in any desired manner to the three journal blocks 62 of the front gang 17. The rear end portions 67 of the bars 65 are bent to lie in a horizontal plane and are connected by transverse angle irons 68 and diagonal members 69 to form a frame 70 which is substantially identical with the frame 31 of the rear gang 16. The extreme forward ends of the bars 65 are bent to lie in a horizontal plane and are connected by rivets 75 to upper and lower forward transverse bars 76.

The inter-gang yoke 18 includes attaching arms 77 which are secured by rivets 78 to the outer faces of the outermost bars 65 of the front gang 17, as clearly shown in Figs. 1 to 5 inclusive. The arms 77 turn downward and have transverse holes at their rear ends. Clevises 79 straddle and are pivotally secured on a horizontal transverse axis by bolts 80 to the rear ends of arms 77. Upper and lower guide bars 82 are identical in form and are held in horizontal spaced relation by their corresponding ends being secured on the upper and lower faces of eyes 84 of the clevises 79 by bolts 85, one of which passes vertically through each of these eyes. The bars 82 are bent so as to form long and short legs 86 and 87 which are connected by curved portions 88. The bars 82 are also held in uniform spaced relation, a distance apart equal to the length of the eyes 84, by a tube-and-rivet spacer element 90.

When the harrow is assembled in a non-working position, as shown in Figs. 1 and 4, the upper and lower guide bars 82 extend rearward so that these guide bars lay respectively on the top and bottom of the control frame 46 and the front bar 26 of the frame of the rear gang 16. The legs 86 are apertured near the fore and aft central axis B—B of the front gang 17 to receive a bolt 95 which passes through the guide bars 82 and one of the eyes 51 of the rear gang control frame 46.

It will thus be seen that the rear and front gangs 16 and 17 may be moved pivotally relative to each other about the bolt 95 and also may have a certain relative movement about the bolts 80, but the lifting of one end of either of the gangs so as to cause one of the gangs to lie in a plane greatly diverging from the horizontal plane passing through the other gang is prevented by the inter-gang yoke 18.

The draft yoke 19 includes a quadrant bar 100 and a brace bar 101 which are connected at their outer ends by a rivet 102. The rear end of the quadrant bar 100 passes between the front bars 76 of the front gang 17 and is secured to these bars by rivets 103. The brace bar 101 is twisted into vertical position at 104 and extends rearward so that its rear end rests against the outer face of the left-hand fore and aft bar 65 and is secured to this bar by rivets 105. The quadrant bar 100 and brace bar 101 thus form a rigid structure substantially triangular in shape which extends forward from the front gang 17. The quadrant bar 100, as shown in Fig. 5, lies in a horizontal plane and is provided at suitable intervals with holes 106.

A latch mechanism 110 has a body 111 which is preferably formed of a casting, the body 111 having a horizontal transverse opening 112 formed therein having side faces shaped as shown in Fig. 8. In the assembly of the draft yoke 19 the quadrant bar 100 is adapted to pass through the opening 112, and as shown in Fig. 8 the opening 112 is of such shape that the body 111 has a limited degree of freedom to rotate on a vertical axis relative to the quadrant bar 100. A boss 113 is formed on the lower central portion of the body 111, the boss 113 being provided centrally with a threaded aperture 114 which is adapted to receive a set screw 115. The set screw 115 has a stud 116 at its upper end, the stud 116 being adapted to be inserted into one of the holes 106 of the quadrant bar 100 so as to retain the body 111 at a desired position upon this quadrant bar. The stud 116 is of slightly less diameter than the holes 106 so that it does not interfere with the freedom of the body 111 for limited rotational movement relative to the quadrant bar 100. The latch member body 111 is also provided with a fore and aft horizontal opening 118 which is preferably disposed just above and crossing the opening 112. The opening 118 is of such cross section and provided for such purpose as will be made evident later.

Formed upon an upper wall 119 of the opening 118 is a box 120 having a head wall 121 and a lever ear 122. The wall 119 and the box head 121 are provided with vertically aligned apertures in which a locking bolt 123 is adapted to be slidably disposed. A washer 124 is disposed about the bolt 123 and held against downward movement thereon by a small pin 125. A spring 126 is disposed between the washer 124 and the box head 121 so as to urge the pin into its downmost position. The bolt 123 has a head 128.

A latch lever 129 is formed of spaced arms 130. The arms 130 may be formed of a single strap bent at 131, the arms then being given the curved shape shown in Figs. 4 and 5, and held in spaced relation by spacer members 132. A cord 133 is adapted to be secured to one of the spacers 132 for the purpose of actuating the lever 129. The forward ends of the lever arms 130 are disposed on opposite sides of the bolt 123 beneath the head 128 thereof and are pivoted by a pin 134 upon the upper end of the lever ear 122. The length of the locking bolt 123 beneath the pin 125 is such that when the spring 126 is extended and the pin 125 rests against the upper face of the wall 119, the lower end of the locking bolt 123 extends into the opening 118 as shown in Fig. 6. When the latch lever cord 133 is pulled forward the locking bolt 123 is lifted so that the lower end is removed from the opening 118.

A unitary sliding draft bar 140 has a forward portion 141 and a rear end portion 142 which are substantially in alignment with each other and an intermediate upwardly bent portion 143. The rear portion 142 is provided with a suitable aperture and is adapted to be pivotally connected by a bolt 145 to the outer end of the rear gang arm 52. The cross sectional form of the draft bar 140 is such that the forward portion 141 is adapted to make a neat sliding fit in the opening 118 of the latch body 111. In the assembly of the harrow the latch bolt 123 is pulled upward, and the forward draft bar portion 141 is slid forward through the opening 118. A jaw 145 is secured by a bolt 146 to the front end portion of the sliding draft bar 140 so that holes 147 formed in the extreme front end of the sliding draft bar 140 and the jaw 145 are in alignment with each other and are adapted to receive a pin (not shown) for imparting traction from a tractor to the harrow 15. Holes 150 are provided at various intervals on the center line of the forward draft bar portion 141. These holes are provided for the reception of the locking bolt 123 so as to lock the sliding draft bar 140 in various extended positions to the latch body 111.

Figure 10:
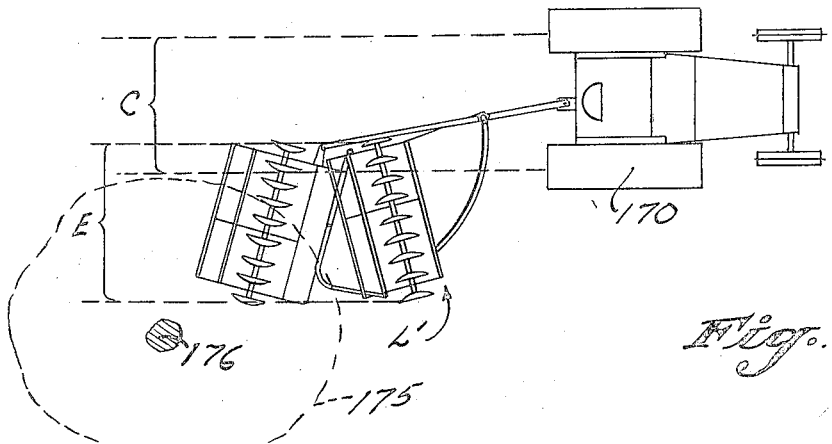

The operation of my disk harrow is as follows: When the parts of the harrow 15 are disposed as shown in Fig. 1, the harrow is adapted to be drawn by a tractor 170 in a lateral non-working position L, as shown in Fig. 10. The path of the tractor 170 in Figs. 9 to 12 inclusive is indicated by the letter C. The path D of the cultivator, when drawn in position L, is seen to have its axis disposed to one side of the axis of the path of the tractor. In other words, the path of the harrow does not coincide with that of the tractor, but merely overlaps an edge portion of the tractor's path and extends a considerable distance outward to one side of the tractor's path. The non-working position L is given to the harrow preparatory to the extending of the parts thereof into a lateral working position L' in which these parts are shown in Fig. 10.

The change from the position L to the position L' is accomplished as follows: While the tractor is in forward motion the operator from the seat of the tractor pulls upon the cord 133 so as to raise the locking bolt 123 out of a hole 150 in which it may be disposed. Inasmuch as the tractive pull of the tractor is transmitted to the harrow by the sliding draft bar 140 mainly through the locking bolt 123 and the casting 111, the withdrawal of the bolt 123 from the hole 150 in which it is disposed during the forward motion of the tractor will cause the forward motion of the harrow 15 to temporarily halt while the sliding draft bar 140 continues its forward motion with the tractor. This causes the sliding draft bar 140 to slide forwardly through the latch body 111 until the bolt 123 is forced downward by the spring 126 into another one of the holes 150 or until the raised draft bar portion 143 comes into contact with the casting 111. This extension of the sliding draft bar 140 of the draft yoke 19 has two results;—it lengthens the draft yoke 19 and simultaneously turns the rear gang 16 on the pivot 95 into the position in which the rear gang is shown in Fig. 2. This causes the disks 22 of the rear gange 16 to dig into the earth and swing the harrow from the non-working lateral position L to the lateral working position L'. It is obvious that in the position L' the harrow has a path E which is disposed almost entirely to one side of the path C of the tractor. It should also be clear that the distance which the harrow moves laterally in changing from the position L to the position L' may be regulated by a choice of the operator between which of the holes 150 he allows the bolt 123 to drop into, this choice obviously determining the amount of the extension of the draft yoke 19 as well as the angle to which the rear gang is rotated relative to the front gang.

In many orchards, and particularly in orange orchards, the branches and foliage of the trees are allowed to grow close to the ground and great difficulty has been hitherto encountered in the effort to cultivate the ground up close to the trees without damaging the lower foliage of the trees. In Fig. 10 a tree is indicated by the broken line 175, this tree having a trunk 176. When the gangs of my harrow are in the working position L', the disks thereof sink into the ground, and the axle and frame portions of the gangs are disposed very close to the surface of the ground. There being no superstructure which rises above the disks except along the edge of the harrow nearest the tractor, the harrow is thus able to pass under the edge of the tree 175 close to the trunk 176 with practically no damage to the low hanging foliage of the tree. This is an important feature of my invention as at the present time there are great losses from the damaging of trees and the destruction of fruit upon the trees in the endeavor to cultivate the earth up close to the trunks thereof.

Another important feature of my invention is the connection between the front and rear gangs which permits the angling of these gangs by a relatively short movement of the tractor relative to the harrow. For instance in Fig. 2, the position of the arm 52 when the harrow is in the position L is indicated by the broken lines 176. The distance which it is necessary for the tractor to move relative to the harrow 15 in order to angle the gangs from the position L to the position L' is indicated by the letter H. This distance in actual practice is about a foot and permits very quick manipulation of the harrow by the operator of the tractor. Also the restoring of the gangs to parallel position is accomplished by a backward movement of the tractor a distance H relative to the harrow 15. This easy operation of the harrow results in a large measure from the pivot 95 being located substantially on the fore and aft axis of the rear gang 16, and from the linking of the tractor directly to the rear gang at one side of the pivot 95 so that rearward or forward movement of the tractor relative to the front gang 17 acts directly upon the rear gang 16.

Figure 11:
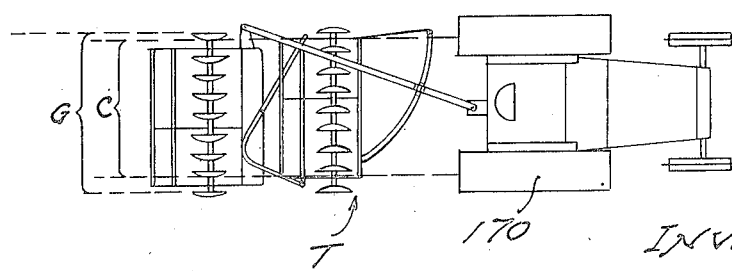

When it is desired to draw the harrow 15 behind the tractor 170 upon a highway it is preferable that the harrow trail behind in a non-working position T, as shown in Fig. 11. In order to cause the harrow to assume this position the screw 115 is rotated to withdraw the stud 116 from the extreme left-hand hole 106 in which it is disposed in Figs. 1 and 5. The tractor is then cramped and backed relative to the harrow so as to slide the latch body 111 along the quadrant bar 100 until the stud 116 is opposite another of the holes 106 in the center portion of the quadrant bar 100. The screw 115 is then rotated to project the stud 116 into this hole 106. The front end of the draft bar 140 is now disposed as shown in Fig. 11 or practically on the fore and aft axis of the harrow and this results in the harrow trailing directly behind the tractor when the harrow is in the non-working position T. When the harrow arrives in a field in which it is desired that its members be extended into the working position L', the latch body 111 is restored to the position in which it is located in Figs. 1 and 5, this bringing the parts of the harrow into the position L and the extension of the parts of the tractor from this position into the position L' and return is accomplished as previously described.

Figure 12:
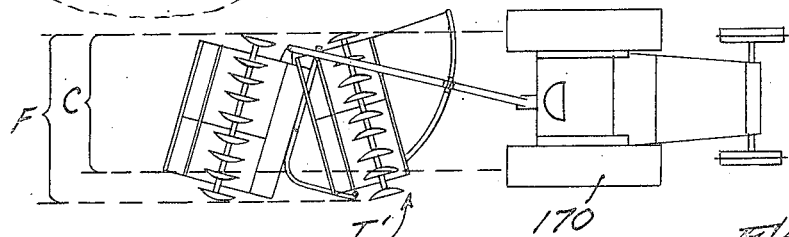

In case it is desired to work a path directly trailing the tractor, the parts of the harrow may be brought into a working position T', as shown in Fig. 12. The position T' is accomplished from the position T in identically the same manner as the position L' from the position L; that is, the operator draws upon the rope 133 until the draft yoke 19 has been extended a desired distance whereupon the bolt 123 is allowed to drop into one of the holes 150 of the draft bar 140. Thus the harrow 15 may be drawn in non-working position T over any public highway and through gates and between other obstacles, where it is necessary that the harrow trail directly behind the tractor, and it may be quickly and easily extended in the field to the non-working and working positions L and L' for the purpose of cultivating underneath the foliage of trees or other low objects as previously described.

As above mentioned briefly, another important feature of my invention is the flexible connection upon a transverse horizontal axis between the front and rear gangs which is afforded by the pivotal connection at 80 of the inter-gang yoke 18 to the front gang 17. This pivotal connection permits the limited flexing of the harrow structure on a horizontally transverse axis, but due to the embracing relation of the upper and lower guide bars 82 of the inter-gang yoke 18 upon the control frame 46 of the rear gang 16 the front and rear gangs are susbstantially tied together in the same horizontal plane. This connection between the front and rear gangs prevents one end of either of the gangs rising out of the ground in case it happens to be passing through earth which is a little harder than that encountered by the remaining portion of that gang. In other words, it ties both gangs of the harrow together so that a uniform working of the earth is insured. Particular merit is achieved by my harrow due to the wide range of choice in cutting angles of the gangs which may be had by selection of the hole 150 in which the bolt 123 is permitted to drop. Also the harrow may be operated, with the gangs at any of these angles, and with the harrow disposed anywhere between the trailing position T' and the extreme extended position L'.

Two pivot eyes 51 are shown as provided upon the control frame 46 of the rear gang 16, these eyes being fairly close together. The choice of which of these holes is utilized to act as the pivot hole receiving the bolt 95 is determined by the axact angle which it is desired the rear gang make relative to the front gang for a given movement of the sliding bar 140. It is to be noted that one of these holes 51 is directly on the fore and aft central axis A—A of the rear gang 16, while both of these holes are near the axis A—A of the rear gang as well as near the fore and aft central axis B—B of the front gang 17.

It is also desired to point out that the securing of the lateral working position L' of the harrow 15 results in a large measure from the arrangement of the main draft yoke 19 so that the point of application of tractive pull, which is at the holes 147, is offset a considerable distance to one side of the fore and aft central axis B—B of the front gang 17.

I claim as my invention:

1. In a disk harrow, the combination of: a single front disk gang; a single rear disk gang connected to said front gang so as to be shiftable between different angular relations therewith, said disk gangs forming a substantially independent pair of gangs; and a substantially unitary draft member attached to said rear gang, eccentric of the connection to said rear gang to said front gang, said member being adapted to be connected, at any one of a plurality of points disposed in a fore and aft direction relative to each other upon said member, to said front gang at any one of a plurality of points disposed substantially transversely relative to each other upon said front gang.

2. In a disk harrow, the combination of: a single front disk gang; a single rear disk gang connected to said front gang, at a point substantially on the fore and aft axis of said rear gang, so as to be shiftable between different angular relations therewith, said disk gangs forming a substantially independent pair of gangs; and a substantially unitary draft member attached to said rear gang, eccentric of the connection to said rear gang to said front gang, said member being adapted to be connected, at any one of a plurality of points disposed in a fore and aft direction relative to each other upon said member, to said front gang at any one of a plurality of points disposed substantially transversely relative to each other upon said front gang.

3. In a disk harrow, the combination of: a single front disk gang; a single rear disk gang connected to said front gang so as to be shiftable between different angular relations therewith, said disk gangs forming a substantially independent pair of gangs; a substantially unitary draft member attached to said rear gang, eccentric of the connection to said rear gang to said front gang, said member being slidable relative to said front gang; and latch means for latching said member to said front gang, at any one of a plurality of points disposed in a fore and aft direction relative to each other upon said member, to said front gang at any one of a plurality of points disposed substantially transversely relative to each other upon said front gang.

4. In a disk harrow, the combination of: a single front disk gang; a single rear disk gang connected to said front gang so as to be shiftable between different angular relations therewith, said disk gangs forming a substantially independent pair of gangs; a substantially unitary draft member attached to said rear gang, eccentric of the connection to said rear gang to said front gang, said member being slidable relative to said front gang; and latch means, slidably mounted upon said front gang, for latching said member to said front gang, at any one of a plurality of points disposed in a fore and aft direction relative to each other upon said member, to said front gang at any one of a plurality of points disposed substantially transversely relative to each other upon said front gang.

In testimony whereof, I have hereunto set my hand at Los Angeles, California, this 4th day of Feb., 1927.

FORD W. HARRIS.